US012660956B2

(12) United States Patent
Tan

(10) Patent No.: US 12,660,956 B2
(45) Date of Patent: Jun. 23, 2026

(54) ANTI-SLIP FLOOR MAT AND PREPARING METHOD THEREOF

(71) Applicant: Pei Tan, Shenzhen (CN)

(72) Inventor: Pei Tan, Shenzhen (CN)

( * ) Notice: Subject to any disclaimer, the term of this patent is extended or adjusted under 35 U.S.C. 154(b) by 11 days.

(21) Appl. No.: 18/789,707

(22) Filed: Jul. 31, 2024

(65) Prior Publication Data

US 2026/0033656 A1 Feb. 5, 2026

(51) Int. Cl.
| | |
|---|---|
| *A47G 27/02* | (2006.01) |
| *B32B 5/02* | (2006.01) |
| *B32B 7/12* | (2006.01) |
| *B32B 27/04* | (2006.01) |
| *B32B 27/08* | (2006.01) |
| *B32B 27/12* | (2006.01) |
| *B32B 27/18* | (2006.01) |
| *B32B 27/20* | (2006.01) |
| *B32B 27/22* | (2006.01) |
| *B32B 27/30* | (2006.01) |

(Continued)

(52) U.S. Cl.
CPC ............ *A47G 27/0281* (2013.01); *B32B 5/02* (2013.01); *B32B 27/12* (2013.01); *B32B 27/18* (2013.01); *B32B 27/302* (2013.01); *B32B 27/32* (2013.01); *B32B 37/12* (2013.01); *B32B 7/12* (2013.01); *B32B 27/04* (2013.01); *B32B 27/08* (2013.01); *B32B 27/20* (2013.01); *B32B 27/22* (2013.01); *B32B 2037/1215* (2013.01); *B32B 2262/0276* (2013.01); *B32B 2264/10* (2013.01); *B32B 2264/104* (2013.01); *B32B 2270/00* (2013.01); *B32B 2307/744* (2013.01); *B32B 2325/00* (2013.01); *B32B 2367/00*

(2013.01); *B32B 2471/00* (2013.01); *B32B 2471/04* (2013.01); *C08L 23/12* (2013.01); *C08L 53/02* (2013.01); *C08L 2666/30* (2013.01); *C08L 2666/54* (2013.01); *C08L 2666/68* (2013.01); *C09J 123/12* (2013.01); *C09J 153/02* (2013.01)

(58) Field of Classification Search
None
See application file for complete search history.

(56) References Cited

U.S. PATENT DOCUMENTS

| | | | | |
|---|---|---|---|---|
| 3,871,948 | A | * | 3/1975 | Norris ..................... B32B 5/245 28/112 |
| 5,418,052 | A | * | 5/1995 | Sugie ................... C09J 153/025 524/505 |

(Continued)

FOREIGN PATENT DOCUMENTS

| | | | | |
|---|---|---|---|---|
| JP | 2007-224101 | A | * | 9/2007 |
| JP | 2010-125057 | A | * | 6/2010 |

OTHER PUBLICATIONS

"Mineral Oil—Wikipedia" (https://en.wikipedia.org/wiki/Mineral_oil) (webpage retrieved Sep. 26, 2024). (Year: 2024).*

*Primary Examiner* — Vivian Chen
(74) *Attorney, Agent, or Firm* — Che-Yang Chen

(57) ABSTRACT

An anti-slip floor mat includes one or more mat layers, and a base layer which is provided at a bottom of the one or more mat layers, wherein the base layer contains polypropylene, white oil, and Styrene Ethylene Butylene Styrene. Through the material properties of the base layer, the anti-slip floor mat is prevented from moving or warping under the pressure of a chair, thereby ensuring that the chair moves smoothly on the floor mat.

18 Claims, 6 Drawing Sheets

(51) Int. Cl.

| | | |
|---|---|---|
| *B32B 27/32* | (2006.01) |
| *B32B 37/12* | (2006.01) |
| *C08L 23/12* | (2006.01) |
| *C08L 53/02* | (2006.01) |
| *C09J 123/12* | (2006.01) |
| *C09J 153/02* | (2006.01) |

(56) References Cited

U.S. PATENT DOCUMENTS

| | | | | |
|---|---|---|---|---|
| 5,472,763 A * | 12/1995 | Schwarz | B32B 5/022 |
| | | | 428/95 |
| 5,538,776 A * | 7/1996 | Corbin | D06N 7/0081 |
| | | | 428/95 |
| 5,994,450 A * | 11/1999 | Pearce | C08L 51/006 |
| | | | 524/505 |
| 7,067,184 B1 * | 6/2006 | Carkeek | A47G 23/03 |
| | | | 428/101 |
| 2002/0187300 A1 * | 12/2002 | Nakasuji | B32B 5/26 |
| | | | 428/95 |
| 2004/0079468 A1 * | 4/2004 | Reisdorf | D06N 7/0081 |
| | | | 156/72 |
| 2005/0233106 A1 * | 10/2005 | Imamura | D06N 7/0076 |
| | | | 428/95 |
| 2005/0287334 A1 * | 12/2005 | Wright | D06N 7/0081 |
| | | | 428/95 |
| 2006/0049386 A1 * | 3/2006 | Kody | B32B 27/12 |
| | | | 252/500 |
| 2006/0189759 A1 * | 8/2006 | Walther | C08L 23/0815 |
| | | | 525/192 |
| 2009/0226661 A1 * | 9/2009 | Laurent | A47L 23/266 |
| | | | 428/92 |
| 2011/0112219 A1 * | 5/2011 | Schachtely | C08J 3/226 |
| | | | 524/505 |
| 2011/0143083 A1 * | 6/2011 | Scorgie | B32B 5/24 |
| | | | 428/221 |
| 2014/0134387 A1 * | 5/2014 | Yamada | B32B 5/245 |
| | | | 428/95 |
| 2016/0262561 A1 * | 9/2016 | Pearce | B32B 3/266 |
| 2017/0198127 A1 * | 7/2017 | Park | C08L 21/00 |
| 2018/0305861 A1 * | 10/2018 | May | B32B 27/08 |
| 2021/0138780 A1 * | 5/2021 | Dong | B32B 37/12 |
| 2022/0033608 A1 * | 2/2022 | Auger | B29B 9/16 |
| 2022/0064830 A1 * | 3/2022 | Shun Lin | B32B 5/024 |
| 2023/0064875 A1 * | 3/2023 | Sethna | D06N 7/0071 |
| 2024/0318379 A1 * | 9/2024 | Himstedt | B32B 5/273 |

* cited by examiner

10

101

30

301

Check the quality of the material of the polyester fiber of the two mat layers 10 and 20 and store them in the waiting position for loading

Introduce the two mat layers 10 and 20 into different rollers, and simultaneously allow them to enter a pressure shaft, add a glue and laminate them under a predetermined pressure and temperature to form a composite layer 2

Feed the composite layer 2 into a binding machine and a hot melt adhesive 3 is added; the hot melt adhesive 3 melts at a predetermined temperature and then is adhered to the composite layer 2 under pressure; after cooling, the hot melt adhesive 3 is cured to form the bottom layer 30 adhered to the middle mat layer 20

Perform heat transfer printing on a top of the top mat layer 10 to form the heat transfer layer 101

Cut the integral mat material into pieces to form the anti-slip floor mat and lock the edges of the anti-slip floor mat by the edge wrapping layer 40

ANTI-SLIP FLOOR MAT AND PREPARING METHOD THEREOF

BACKGROUND OF THE PRESENT INVENTION

Field of Invention

The present invention relates to floor mat, and more particularly to an anti-slip floor mat and preparing method thereof.

Description of Related Arts

In today's office or home environment, floor mats have become an indispensable part. They not only protect the floor, but also provide a comfortable working or resting environment. The use of floor mats is not only to protect the floor from damage, but also to meet the needs of efficient and comfortable work. However, the common floor mat materials on the market, such as PVC, tempered glass, polyester fiber plus hard board, rubber and TPE, etc., although each has its own characteristics, have exposed many shortcomings in actual application.

Although PVC floor mats have a certain degree of softness and sound insulation, they are less durable, easily age and deform over time, and hinder the movement of tables and chairs. Tempered glass floor mats have a smooth surface and are easy to clean, but have almost no sound insulation effect, and once they come into contact with water, they become extremely slippery, posing a safety hazard. polyester fiber plus hard board floor mats have good air permeability and a more beautiful appearance, but they are not wear-resistant enough and are prone to warping. Rubber floor mats have good anti-slip properties, but have defects in dirt resistance and cleaning. TPE floor mats have good environmental performance, but the price is relatively high, and the sound insulation effect is not ideal.

What's more serious is that these floor mats generally have poor noise resistance. In densely populated office areas, noise control of floor mats is particularly important. Existing floor mat products often fail to effectively absorb or reduce the noise generated by walking and moving office chairs, affecting the office atmosphere.

In terms of anti-slip properties, although some materials such as rubber floor mats have certain anti-slip capabilities, the anti-slip performance of most floor mat products is greatly reduced when encountering water or humid environments, increasing the risk of injury to workers.

Regarding the stability issue, some floor mat products are prone to warping or shifting under the pressure of office chair wheels due to unreasonable design or material characteristics. This not only affects the appearance and service life of the floor mat, but also brings inconvenience to users and affects work efficiency.

Maintenance and durability are also major issues with conventional floor mat materials. For example, PVC floor mats will crack and fade after long-term use, and the replacement frequency is relatively high; tempered glass floor mats cannot be folded, and are difficult to replace after being damaged, and once damaged, they may produce dangerous fragments; floor mats made of other materials also have similar problems of difficult maintenance and low durability.

SUMMARY OF THE PRESENT INVENTION

The invention is advantageous in that it provides an anti-slip floor mat and preparing method thereof, wherein the anti-slip floor mat can be effectively attached to a floor through the material properties of a base layer and maintain excellent anti-slip properties, preventing the anti-slip floor mat from moving or warping under the pressure of a chair, thereby ensuring that the chair moves smoothly on the floor mat.

Another advantage of the present invention is to provide an anti-slip floor mat and preparing method thereof, wherein a texture of the base layer enlarges the frictional contact area between the bottom surface of the anti-slip floor mat and the floor, thereby providing more friction to enhance the anti-slip effect.

Another advantage of the present invention is to provide an anti-slip floor mat and preparing method thereof, wherein a SEBS material added into the base layer of the anti-slip floor mat increases the elasticity and adhesion of the base layer, so that when the base layer contacts the floor, adhesion is generated between the molecular structure of the contact bottom surface of the base layer and the floor, further preventing the anti-slip floor mat from sliding and warping up under pressure.

Another advantage of the present invention is to provide an anti-slip floor mat and preparing method thereof, wherein the thermal transfer printing technology used in the upper fabric can make the printed pattern rich in layers and bright in color, and stably combined with the material and have good wear resistance, so that the anti-slip floor mat not only improves the aesthetics but also improves the durability and will not fade due to long-term use.

Another advantage of the present invention is to provide an anti-slip floor mat and preparing method thereof, wherein the anti-slip floor mat is provided with good quiet performance, excellent anti-slip effect, stable structure, not easy to warp, simple maintenance and durability. Such a floor mat will greatly improve the comfort and safety of the office or home environment, improve work efficiency, and reduce long-term maintenance costs.

According an aspect, the present invention provides an anti-slip floor mat, comprising:

one or more mat layers; and a base layer which is provided at a bottom of the one or more mat layers, wherein the base layer comprises polypropylene, white oil, and Styrene Ethylene Butylene Styrene.

According to an embodiment, a weight content of polypropylene in the base layer is ranged from 5% to 30%, wherein a weight content of Styrene Ethylene Butylene Styrene in the base layer is ranged from 20% to 50%, wherein a weight content of white oil in the base layer is ranged from 25% to 45%.

According to an embodiment, wherein the base layer further comprises calcium carbonate, wherein a weight content of calcium carbonate in the base layer is ranged from 0% to 50%.

According to an embodiment, wherein the base layer further comprises polyethylene, wherein a weight content of polyethylene in the base layer is ranged from 0% to 1%.

According to an embodiment, a material of the one or more mat layers is selected from the group consisting of rubber, polyvinyl chloride, polyester fiber, cotton, and polypropylene.

According to an embodiment, a material of the one or more mat layers is polyester fiber.

According to an embodiment, the one or more mate layers comprises a top mat layer and a middle mat layer, wherein the middle mat layer is provided between the top mat layer and the base layer.

According to another aspect, the present invention provides a preparing method of an anti-slip floor mat, comprising a step of forming a base layer on a bottom of one or more mat layers, wherein the base layer comprises polypropylene, white oil, and Styrene Ethylene Butylene Styrene.

According to an embodiment, the method further comprises a step of mixing polypropylene and white oil, and then adding Styrene Ethylene Butylene Styrene into a mixture of polypropylene and white oil.

According to an embodiment, in this method, a weight content of polypropylene in the base layer is ranged from 5% to 30%, wherein a weight content of Styrene Ethylene Butylene Styrene in the base layer is ranged from 20% to 50%, wherein a weight content of white oil in the base layer is ranged from 25% to 45%.

According to an embodiment, the method further comprises a step of forming a hot melt adhesive by polypropylene, white oil, and Styrene Ethylene Butylene Styrene, hot melting the hot melt adhesive to form the base layer which is integrated on the bottom of the one or more mat layers.

According to an embodiment, the method further comprises a step of adding calcium carbonate and polyethylene into the mixture of polypropylene and white oil, wherein a weight content of calcium carbonate in the base layer is ranged from 0% to 50%, wherein a weight content of polyethylene in the base layer is ranged from 0% to 1%.

According to an embodiment, the method further comprises the steps of binding a top mat layer to a middle mat layer to form a composite layer, and forming the base layer on a bottom of the middle mat layer in a manner that the middle mat layer is sandwiched between the top mat layer and the base layer, wherein a material of the top mat layer and the middle mat layer is polyester fiber According to another aspect, the present invention provides an anti-slip floor mat suitable for office or home use, wherein the anti-slip floor mat comprises:

a first polyester fiber layer;

a second polyester fiber layer, wherein the first polyester fiber layer is bonded to a top of the second polyester fiber layer; and a base layer bonded to a bottom of the second polyester fiber layer, and the base layer is made of polypropylene, SEBS, white oil, calcium carbonate and polyethylene mixed in proportion.

Preferably, in the base layer, the polypropylene content ranges from 5% to 30%, the SEBS content ranges from 20% to 50%, the white oil content ranges from 25% to 45%, the calcium carbonate content ranges from 0% to 50%, the polyethylene content ranges from 0% to 1%.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIG. 6 is a flow chart illustrating the preparing process of the anti-slip floor mat according to the alternative mode of the preferred embodiment of the present invention.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
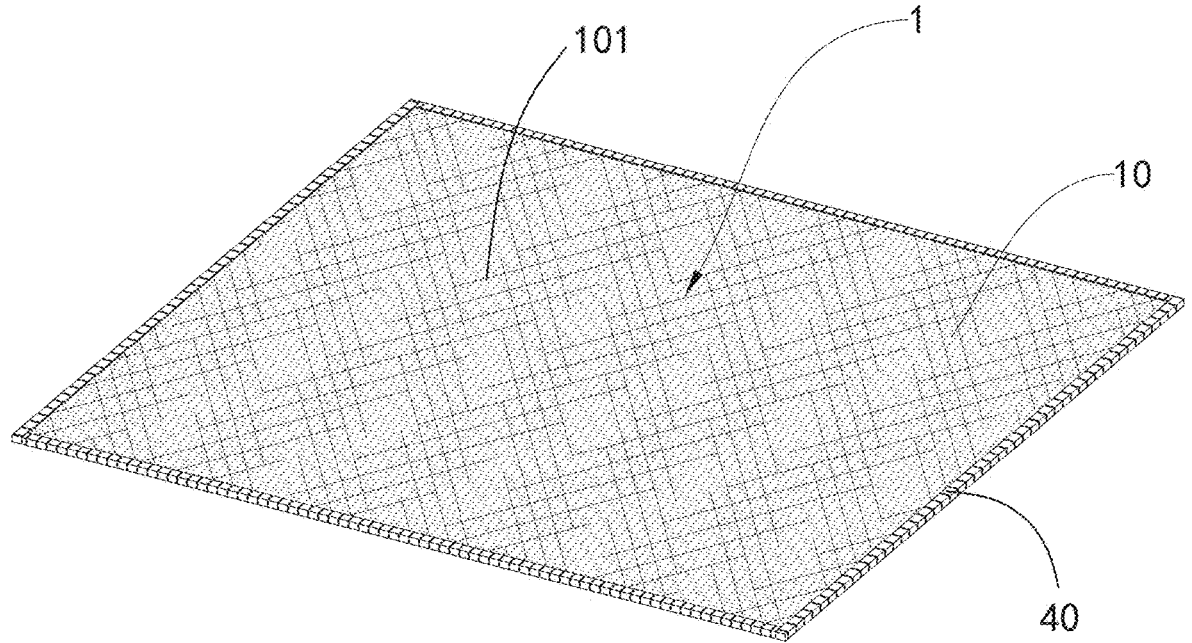
FIG. 1 is a perspective view of an anti-slip floor mat according to a preferred embodiment of the present invention.
Figure 2:
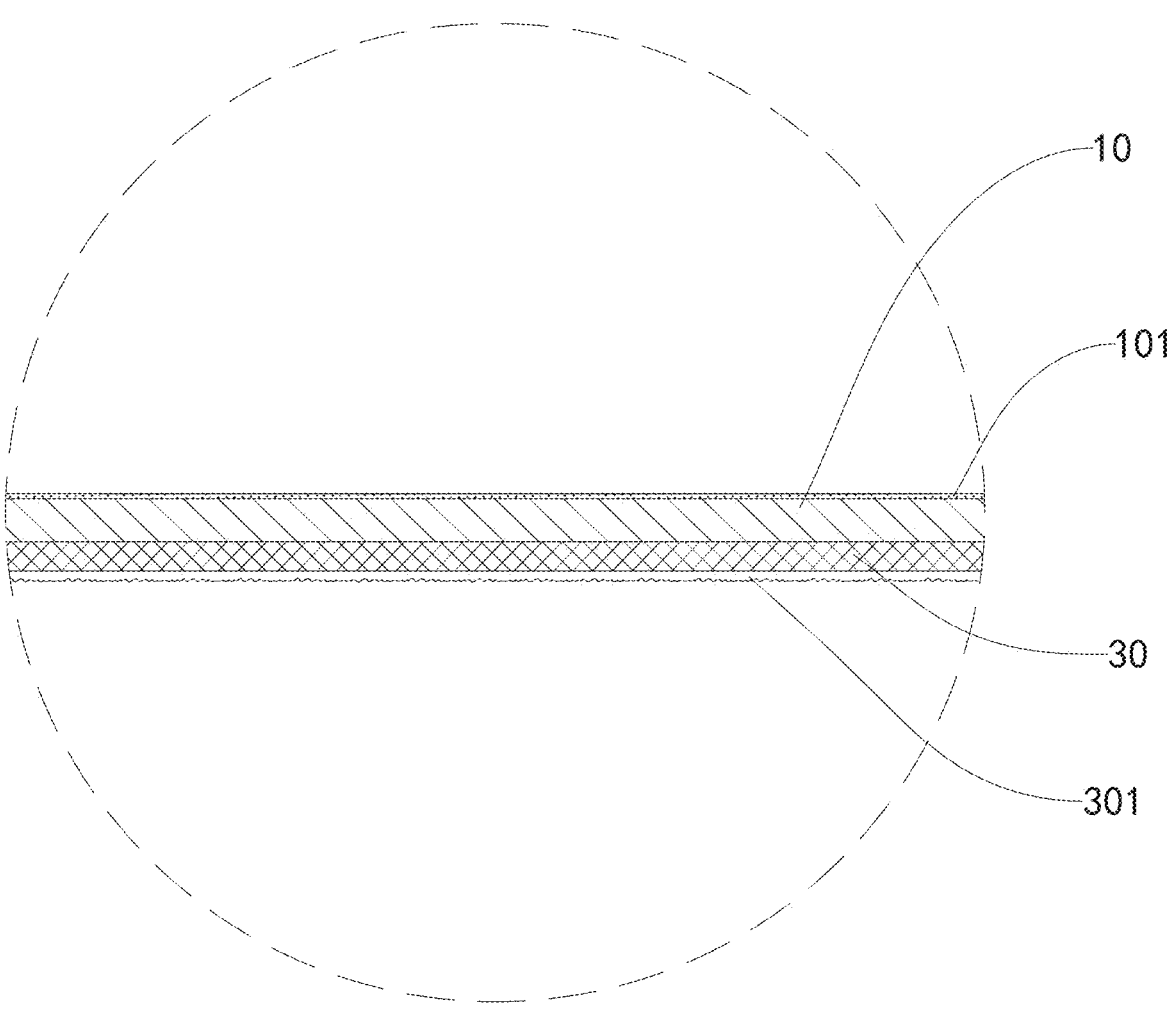
FIG. 2 is a sectional view of the anti-slip floor mat according to the preferred embodiment of the present invention.

Referring to FIGS. 1 to 2, an anti-slip floor mat for office or home use according to a preferred embodiment of the present invention is illustrated. The anti-slip floor mat comprises one or more mat layers 1 and a base layer 30 attached to a bottom of the mat layers 1. In this embodiment, the anti-slip floor mat comprises a single mat layer 1 which is a top mat layer 10 and the base layer 30 is attached to the bottom of the top mat layer 10.

The material of the mat layer 1 can be any suitable material such as rubber, PVC (polyvinyl chloride), polyester fiber, cotton, polypropylene. Preferably, the mat layer 1 can be made of polyester fiber.

Polyester fiber is an synthetic fiber derived from petroleum and is formed through a process of polymerization which links monomers into long polymer chains. The most common type of polyester is polyethylene terephthalate (PET).

Polyester fiber consists of long chains of polymers made up of repeating units of the ester functional group (—CO—O—). The chains are highly crystalline and have strong intermolecular forces, which contribute to the fiber's strength and durability.

The production of polyester fibers involves the following key steps.

Polymerization: The process begins with the polymerization of ethylene glycol and terephthalic acid (or dimethyl terephthalate) to form PET. This can be done through either direct esterification or transesterification, followed by polycondensation.

Spinning: The molten polymer is extruded through spinnerets (devices with tiny holes) to form long continuous filaments.

Drawing: The filaments are drawn or stretched to align the polymer chains, enhancing the fiber's strength and elasticity.

Crimping: To give the fibers a textured appearance and increase bulkiness, they can be crimped.

Cutting: The continuous filaments can be cut into staple fibers if short fibers are desired, similar to natural fibers like cotton or wool.

Polyester fiber offers several significant advantages, it is highly resistant to stretching, shrinking, and abrasion, making them ideal for high-wear applications, is also resistant to many chemicals, including most acids and alkalis, ensuring longevity in various environments. This fiber has a low moisture absorption, which makes it quick-drying and less prone to mildew and mold growth. The top mat layer 10 made of polyester fabric is also machine washable and dryable, making them convenient for everyday use.

In addition, polyester fabric is inherently resistant to wrinkling, maintaining their shape and appearance with minimal ironing. It also can be blended with other fibers, such as cotton or wool, to enhance the fabric's properties, including strength, durability, and aesthetics.

Furthermore, polyester fiber can indeed contribute to sound-dampening or noise-reducing effects when used in floor mats. Here are the key points on how a polyester fiber floor mat can provide sound-dampening benefits: the polyester fiber mat has a soft and dense structure, which helps to absorb sound waves rather than reflecting them, so that this can reduce noise levels in a room by minimizing echoes and reverberations; the fibers in polyester mats can trap air and create tiny pockets within the material, which can absorb sound vibrations and reduce noise transmission; the polyester fiber mat can be designed with various pile heights and densities, high-pile or shaggy polyester mat, for example, is particularly effective at noise absorption due to their increased surface area and material volume.

It is worth mentioning that the polyester fiber mat also can be added with additional padding or backing, which adds to their thickness and cushioning properties, and this extra layer can further enhance their ability to dampen sound, making them effective in reducing noise from footsteps and other impacts. Accordingly, the polyester fiber mat can be combined with other sound-dampening materials, such as rubber backing or foam padding, to enhance its acoustic properties. This combination can provide additional benefits for reducing noise levels.

According to this embodiment, the base layer 30 is made of polypropylene, white oil, calcium carbonate and polyethylene mixed in proportion. Preferably, SEBS (Styrene Ethylene Butylene Styrene) is added into the base layer 30.

Polypropylene is a polymer made from the monomer propylene. Its molecular structure consists of long chains of repeating propylene units, characterized by a backbone of carbon atoms with alternating methyl groups (CH3). Polypropylene is isotactic, i.e. the methyl groups are arranged on the same side of the polymer chain, contributing to its crystallinity and mechanical properties. Polypropylene is introduced into the base layer 30 to provide the primary structural framework, contributing to the strength, flexibility, and chemical resistance of base layer 30.

White oil, which is also known as mineral oil or paraffin oil, is a highly refined, colorless, and odorless oil that is derived from petroleum and undergoes extensive purification processes to remove impurities. Its chemical inertness ensures that it does not degrade or react with other substances, providing long-lasting performance. It also offers excellent lubrication properties.

Accordingly, the white oil acts as a plasticizer and lubricant, enhancing the flexibility and pliability of the composite material, and providing a soft feel and improving the mat's resistance to cracking and embrittlement over time.

Calcium carbonate can be filler in the composite material of the base layer 30, it can enhance the stiffness and rigidity of the composite material. The presence of calcium carbonate can also enhance the processability of the composite material during manufacturing. It can improve the flow properties of the melt, making it easier to mold and extrude.

Polyethylene adds flexibility and impact resistance to the composite material of the base layer 30, complementing the properties of polypropylene and contributing to the overall toughness and durability of the base layer 30.

According to this preferred embodiment, due to the use of SEBS material, the elasticity and adhesion of the base layer 30 are greatly improved. When the anti-slip floor mat is laid on the floor, adhesion is generated between the molecular structure of the contact surface of the base layer 30 and the floor, which firmly fixes the anti-slip floor mat on the floor, prevents the anti-slip floor mat from sliding, and ensures that the anti-slip floor mat will not warp up.

More specifically, SEBS is a type of thermoplastic elastomer (TPE), which combines the properties of both rubber and plastic. SEBS is a block copolymer consisting of polystyrene (PS) and poly(ethylene-butylene) blocks. It is formed by hydrogenating Styrene Butadiene Styrene (SBS), which transforms the butadiene units into ethylene-butylene units.

As a TPE, SEBS behaves like rubber at room temperature but can be melted and reprocessed like plastic when heated. SEBS has excellent elasticity, making it suitable for the base layer 30 that require flexibility and resilience.

Particularly, the elasticity and adhesion properties of SEBS make SEBS an ingredient as adhesives of the base layer 30, so that SEBS can provide excellent grip and traction, making it ideal for anti-slip mats. In addition, the soft and flexible nature of SEBS can help absorb sound, contributing to a quieter environment.

Those skilled in the art should understand that the proportions of the polypropylene, SEBS, white oil, calcium carbonate and polyethylene can be changed within a predetermined range according to production requirements to meet different office floor requirements. Preferably, the weight content of SEBS can be any value between 20% and 50%; the weight content of polypropylene in the base layer 30 can be any value between 5% and 30%; the weight content of white oil can be any value between 25% and 45%; the weight content of calcium carbonate can be any value between 0% and 50%; the weight content of polyethylene can be any value between 0% and 1%.

In addition, the anti-slip floor mat further comprises an edge wrapping layer 40 which is wrapped on peripheral surrounding edges of the top layer 10 and the bottom layer 30, so as to enhance the aesthetic appearance of the floor mat. Preferably, the edge wrapping layer 40 comprises two layers which are respectively sewed to the upper and lower surfaces of the edges of the top layer 10 and the base layer 30. The edge wrapping layer 40 can be any soft and flexible material, such as spandex, nylon, polyester, polyvinyl chloride, and fabric.

Figure 3:
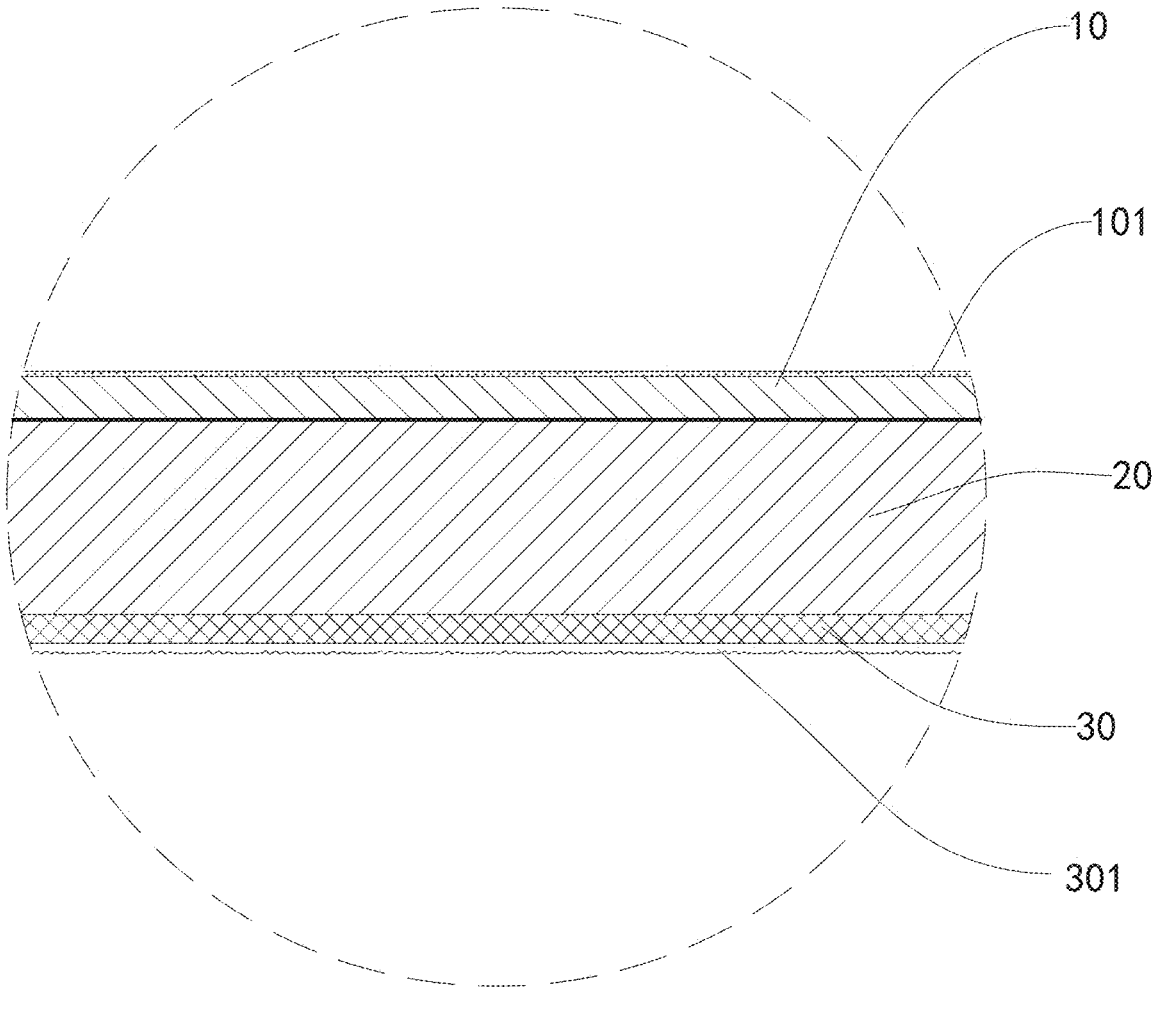
FIG. 3 is a sectional view of the anti-slip floor mat according to an alternative mode of the preferred embodiment of the present invention.

Referring to FIG. 3 of the drawings, the anti-slip floor mat comprises two mat layers 1 which are a top mat layer 10 and a middle mat layer 20, the middle mat layer 20 is provided between the top mat layer 10 and the base layer 30.

Both of the top mat layer 10 the middle mat layer 20 can be made of material selected from the group consisting of rubber, PVC, polyester fiber, cotton, and polypropylene. Preferably, the two layers 10 and 20 can be both of made of polyester fibers, so that the polyester fiber mat can be designed with increased pile heights and densities, so that is particularly effective at noise absorption due to their increased surface area and material volume.

In this embodiment, the top mat layer 10 and the base layer 30 are respectively connected to the two sides of the middle mat layer 20 to form an upper, middle and lower structure for laying on the floor, and when a chair moves on the anti-slip floor mat, the anti-slip floor mat can effectively prevent movement or warping under the pressure of the chair to ensure that the hair moves smoothly on the floor mat.

Referring to FIG. 3, the top mat layer 10 is bonded to the middle mat layer 20 by a glue under certain a pressing condition to achieve a firm connection. The thickness of the top mat layer 10 can be thinner than that of the middle mat layer 20, and the middle mat layer 20 serves as the main structural support layer to maintain the basic shape of the anti-slip floor mat. Alternatively, in anther example, the top mat layer 10 and the middle mat layer 20 can have a same thickness.

It can be understood that the polyester fiber used in the top mat layer 10 and the middle mat layer 20 is highly durable, and the polyester fiber has high strength and good elastic recovery ability, which enables the anti-slip floor mat to still maintain its original structural strength, that is, the original shape and thickness after long-term use, and is not easy to deform. Even after deformation, it is easy to return to its original shape and maintain its original structural strength, which greatly improves the durability of the anti-slip floor mat.

In addition, the top mat layer 10 and the middle mat layer 20 made of polyester fiber are easy to clean. The surface of the polyester fiber is smooth, stains are not easy to adhere, and it is more convenient to clean. It can be easily cleaned with water and neutral detergent, which is particularly suitable for busy office environments and can greatly reduce the amount of cleaning for the user. In addition, polyester fiber has a faster drying speed and can quickly return to the working state even in a humid environment.

At the same time, the polyester fiber also has good chemical stability and is more resistant to corrosion from various chemicals, thereby increasing the usage scenarios of the anti-slip floor mat.

The thicker middle mat layer 20 can provide a softer touch, and can maintain stable and soft support when the user steps on the anti-slip floor mat, thereby reducing fatigue caused by long-term work and improving office comfort.

The top mat layer 10 and the middle mat layer 20 do not release volatile organic compounds and do not contain harmful substances, which helps maintain the air quality in the office. At the same time, the top mat layer 10 and the middle mat layer 20 can also be recycled and remade into new fibers by melting, and have good recyclability.

The top mat layer 10 and the middle mat layer 20 also have good dimensional stability and will not shrink or deform due to changes in temperature or humidity, and can keep the anti-slip floor mat flat and beautiful for a long time. In other words, the top mat layer 10 and the middle mat layer 20 have strong heat resistance and will not shrink or deform even in a high temperature environment. In other words, the anti-slip floor mat is also suitable for office spaces with floor heating, and laying in an office space with floor heating will not cause the performance of the anti-slip floor mat to decline.

As shown in FIG. 1 and FIG. 3, a top of the top mat layer 10 is further provided with a thermal transfer layer 101. The thermal transfer layer 101 is located on the top surface of the top mat layer 10 and is used to present a thermal transfer pattern which is thermally transferred on the surface of the top mat layer 10.

Particularly, the base layer 30 is bonded to the other side of the middle mat layer 20, and the base layer 30 is made of polypropylene, SEBS, white oil, calcium carbonate and polyethylene mixed in proportion.

In this embodiment, it can be understood that the base layer 30 is provided on a bottom of the middle mat layer 20 with a uniform thickness and is firmly connected to the middle mat layer 20.

Similar to the above embodiment, the weight content of polypropylene in the base layer 30 is ranged from 5% and 30%, the weight content of SEBS is ranged from 20% and 50%, the weight content of white oil is ranged from 25% and 45%, the weight content of calcium carbonate is ranged from 0% and 50%, the weight content of polyethylene can be ranged from 0% to 1%.

Furthermore, a bottom side of the base layer 30 that contacts the floor is also provided with a texture pattern 301, and the texture pattern 301 is spread over the bottom surface of the base layer 30 and is preferred to be evenly distributed on the bottom surface of the base layer 30. The texture pattern 301 is formed integrally with the base layer 30 to increase the contact area with the floor when the base layer 30 contacts the floor, thereby enhancing the friction between the anti-slip floor mat and the floor, further preventing the anti-slip floor mat from sliding, and more particularly preventing the chair wheels from moving on the anti-slip floor mat, which will not cause the anti-slip floor mat to warp up, that is, will not move with the chair when the chair moves.

Figure 4:
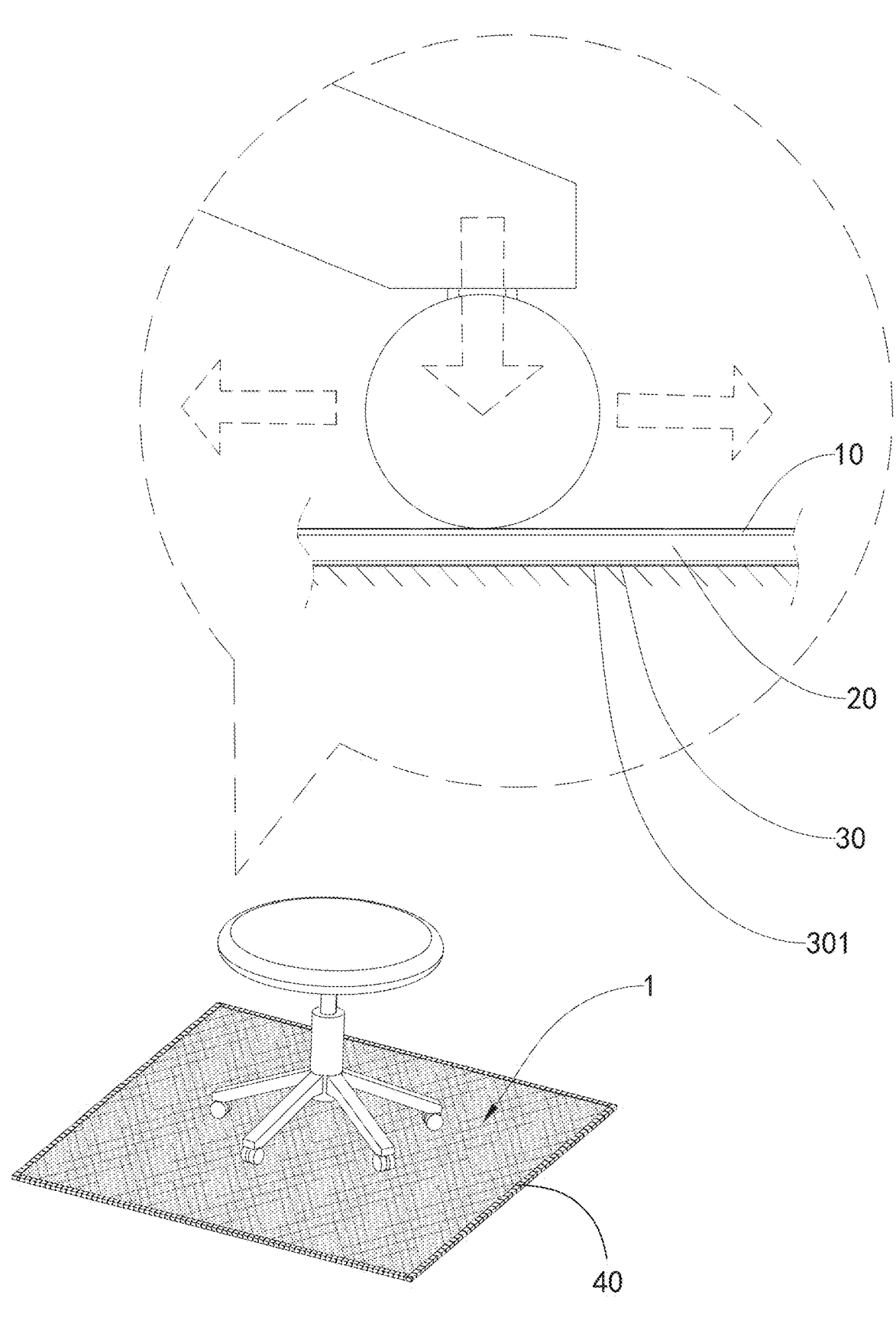
FIG. 4 is a perspective view illustrating an usage application of the anti-slip floor mat under a chair according to the alternative mode of the preferred embodiment of the present invention.

With reference to FIG. 4 of the drawings, a use state of the anti-slip floor mat according to the preferred embodiment of the present invention is illustrated. The anti-slip floor mat is suitable for being used as an office floor mat that is placed on a dry floor of an office. When a chair is placed on the anti-slip floor mat, the anti-slip floor mat is laid in close contact with the dry floor, and the wheels of the chair are located above the anti-slip floor mat, that is, above the thermal transfer layer 101. The wheels exert a downward force on the anti-slip floor mat to squeeze the texture pattern 301 tightly against the dry floor. The texture in the texture pattern 31 is expanded by force, increasing the contact area with the floor, greatly improving the friction between the base layer 30 and the floor, and effectively preventing the base layer 30 from sliding relative to the office floor.

When the chair wheels move, the top mat layer 10 tends to follow the movement of the chair wheels, and the adhesion force generated between the texture layer 31 and the office floor will adsorb the base layer 30 to the office floor, preventing the base layer 30 from moving, and further preventing the top mat layer 10 from moving. In addition, a friction force opposite to the movement of the chair wheels will be generated between the texture layer 31 and the office floor, and SEBS can provide excellent grip and traction, thereby further preventing the anti-slip floor mat from following the movement of the chair wheels, so that the anti-slip floor mat remains stable when the office chair moves, and will not tilt or follow the movement of the office chair, thereby ensuring that the office chair moves smoothly on the anti-slip floor mat.

Figure 5:
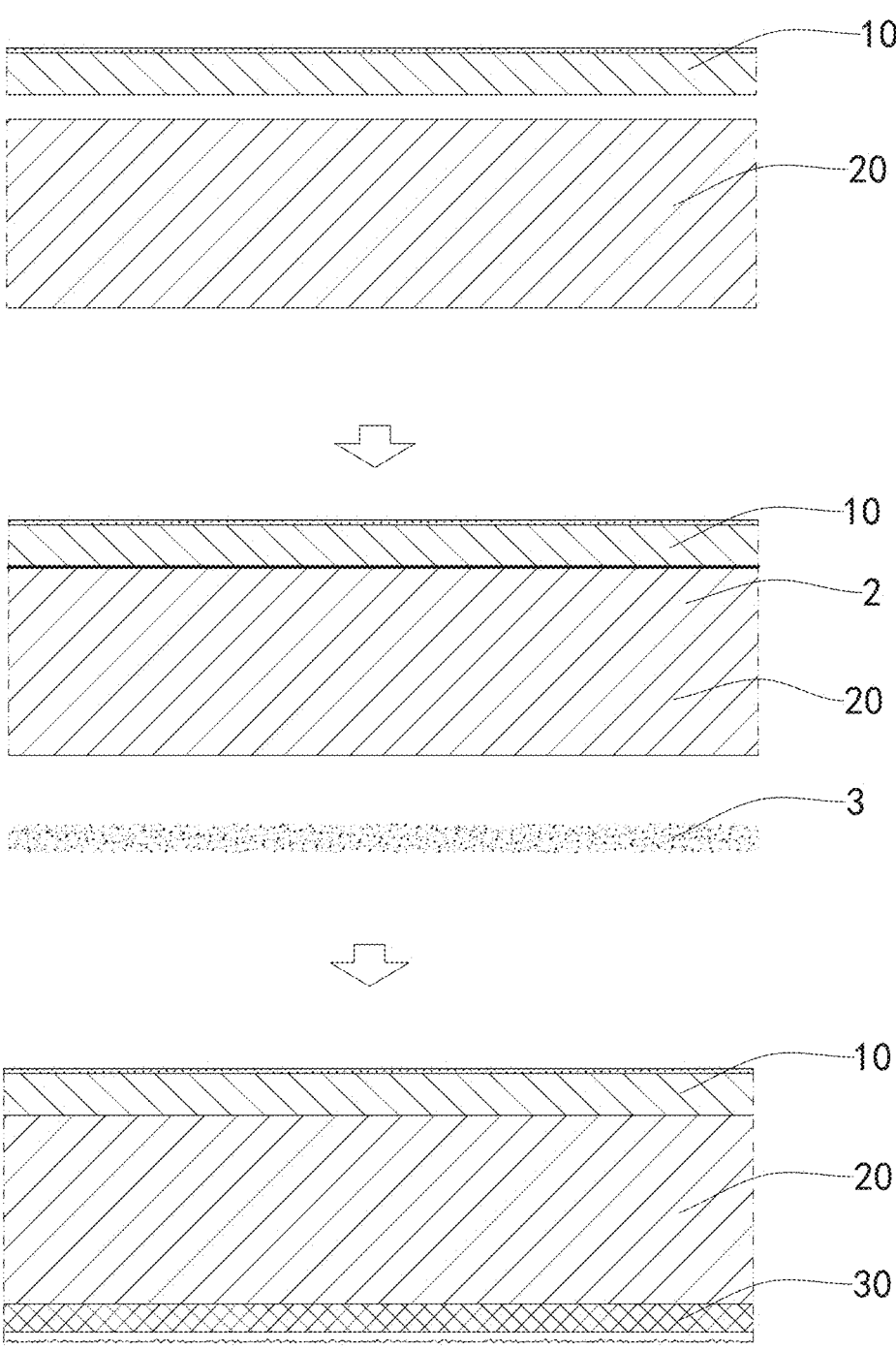
FIG. 5 is a schematic view illustrating the preparing process of the anti-slip floor mat according to the alternative mode of the preferred embodiment of the present invention.

Referring to FIGS. 5 and 6, a preparation process of the anti-slip floor mat according to a preferred embodiment of the present invention is illustrated. The preparation of the anti-slip floor mat comprises the following steps.

(a) Check the quality of the material of the polyester fiber of the two mat layers 10 and 20 and store them in the waiting position for loading.

(b) Introduce the two mat layers 10 and 20 into different rollers, and simultaneously allow them to enter a pressure shaft, add a glue and laminate them under a predetermined pressure and temperature to form a composite layer 2.

(c) Feed the composite layer 2 into a binding machine and a hot melt adhesive 3 is added. The hot melt adhesive 3 melts at a predetermined temperature and then is adhered to the composite layer 2 under pressure. After cooling, the hot melt adhesive 3 is cured to form the bottom layer 30 adhered to the middle mat layer 20.

(d) Perform heat transfer printing on a top of the top mat layer 10 to form the heat transfer layer 101.

(e) Cut the integral mat material into pieces to form the anti-slip floor mat and lock the edges of the anti-slip floor mat by the edge wrapping layer 40.

In detail, in the step (a), before placing the upper mat layer and the middle mat layer in the waiting position, the materials of the upper mat layer and the middle mat layer need to be strictly inspected for quality. This includes checking whether the materials of the upper mat layer and the middle mat layer have damage, stains or other quality problems. Only qualified materials of the upper mat layer and the middle mat layer can enter the next process. The materials of the upper mat layer and the middle mat layer are transferred from the warehouse to the production line and placed in the designated waiting position for loading so that they can be quickly used in the production process to improve production efficiency.

In the step (b), the materials of the upper mat layer and the middle mat layer are introduced into different rollers respectively. This step needs to ensure that the materials of the upper mat layer and the middle mat layer are flat and tensioned to avoid wrinkles or deflection. When the materials of the upper mat layer and the middle mat layer enter the pressure shaft, add a proper amount of glue, which needs to be evenly coated on the surface of the joint surface of the materials of the upper mat layer and the middle mat layer to prepare for the combining process. According to the characteristics of the materials of the upper mat layer and the middle mat layer and the demand for glue, adjust the pressure and temperature of the pressure shaft. Under a predetermined pressure and temperature, the glue can better combine with the material of the upper mat layer and the middle mat layer to form a stable composite layer 2.

In the step (c), the composite layer 2 is fed into a laminating machine for further processing. This step requires ensuring that the tension of the composite layer 2 is moderate to avoid tensile deformation during the laminating process, and adding the hot melt adhesive 3 into the laminating machine. The hot melt adhesive 3 melts at high temperatures so that it can better penetrate and bond to the bottom of the composite fabric. At a predetermined temperature, the hot melt adhesive 3 melts and fully contacts the composite layer 2. Through the action of pressure and heat, the hot melt adhesive 3 and the composite layer 2 are bonded together to form an integral body. After bonding, the composite material needs to be cooled to allow the hot melt adhesive 3 to solidify and fix into shape to form base layer 30.

In the step (d), heat transfer patterns are designed according to requirements. These patterns can be company logos, decorative patterns, etc. The designed patterns need to be output to the transfer paper in reverse form, and the temperature and pressure of the heat transfer equipment are adjusted to ensure that the pattern on the transfer paper can be effectively transferred to the top mat layer 10. The transfer paper with the pattern is aligned with the top mat layer 10, and the pattern is transferred to the top mat layer 10 through high temperature and high pressure. After the transfer is completed, the transfer paper is torn off, and the pattern is firmly printed on the surface of the upper fabric.

In the step (e), according to the design size and usage requirements of the floor mat body, use a cutting tool to cut the integral mat into corresponding shapes and sizes. When cutting, be careful to keep the edges neat and avoid burrs. In order to prevent the silk threads on the edges of the floor mat body from falling off or opening, the edges of the floor mat body after cutting are locked by the edge wrapping layer 40. This step can enhance the durability and aesthetics of the floor mat body.

Those skilled in the art can understand that the particles of the hot melt adhesive 3 is made by mixing the polypropylene, SEBS, white oil, calcium carbonate and polyethylene in proportion.

More specifically, calcium carbonate and other material such as polyethylene are mixed evenly and then is mixed with polypropylene under a temperature about 160° C., and then white oil is added into the mixture, and finally SEBS is added into the mixture under a temperature about 100° C.

During the mixing process, the weight content of polypropylene in the hot melt adhesive 3 can be any value between 5%-30%, the weight content of SEBS is any value between 20%-50%, the weight content of white oil is any value between 25%-45%, the weight content of calcium carbonate is any value between 0%-50%, the weight content of polyethylene is in the range of 0%-1%.

Alternatively, the base layer 30 is independently formed in a molding machine, and then is adhered to the composite layer 2 by a glue.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and are subject to change without departure from such principles. Therefore, this invention includes all modifications encompassed within the spirit and scope of the following claims.

What is claimed is:

1. An anti-slip floor mat, comprising:

a top mat layer having a thermal transfer pattern integrated on a top surface of said top mat layer, wherein said top mat layer is a single layer made of polyester fiber;

a middle mat layer bonded and glued on a bottom surface of said top mat layer, wherein said middle mat layer is a single layer made of a material selected from a group consisting of rubber, PVC, polyester fiber, cotton, and polypropylene; and a base layer integrally formed at a bottom surface of said middle mat layer for providing an anti-slip ability, such that said middle mat layer is bonded and sandwiched between said top mat layer and said base layer, wherein said base layer is made of a composition comprising polypropylene, white oil, and Styrene Ethylene Butylene Styrene;

wherein said middle mat layer serves as a main structural support layer to maintain a shape of the top mat layer, wherein a thickness of said middle mat layer is greater than a thickness of said top mat layer.

2. The anti-slip floor mat, as recited in claim 1, wherein a weight content of polypropylene in said base layer is ranged from 5% to 30%, wherein a weight content of Styrene Ethylene Butylene Styrene in said base layer is ranged from 20% to 50%, wherein a weight content of white oil in said base layer is ranged from 25% to 45%.

3. The anti-slip floor mat, as recited in claim 2, wherein said base layer further comprises calcium carbonate, wherein a weight content of calcium carbonate in said base layer is not more than 50%.

4. The anti-slip floor mat, as recited in claim 3, wherein said base layer further comprises polyethylene, wherein a weight content of polyethylene in said base layer is not more than 1%.

5. The anti-slip floor mat, as recited in claim 4, wherein said base layer further has a texture pattern integrated and formed over a bottom surface of said base layer to increase a floor contact area of said base layer.

6. The anti-slip floor mat, as recited in claim 2, wherein said base layer further comprises polyethylene, wherein a weight content of polyethylene in said base layer is not more than 1%.

7. The anti-slip floor mat, as recited in claim 2, wherein said base layer further has a texture pattern integrated and formed over a bottom surface of said base layer to increase a floor contact area of said base layer.

8. The anti-slip floor mat, as recited in claim 1, wherein said base layer further has a texture pattern integrated and formed over a bottom surface of said base layer to increase a floor contact area of said base layer.

9. A preparing method of an anti-slip floor mat, comprising the steps of:

bonding a top mat layer on a top surface of a middle mat layer by adding a glue and laminate the top mat layer and the middle mat layer, wherein said top mat layer is a single layer made of polyester fiber, wherein said middle mat layer is a single layer made of a material selected from a group consisting of rubber, PVC, polyester fiber, cotton, and polypropylene, wherein said middle mat layer serves as a main structural support layer to maintain a shape of the top mat layer, wherein a thickness of said middle mat layer is greater than a thickness of said top mat layer; and adding a hot melt adhesive to a bottom of said middle mat layer, wherein said hot melt adhesive is melted at a predetermined temperature and is adhered to said bottom of said middle mat layer to integrally form a base layer on said bottom of said middle mat layer for providing an anti-slip ability, such that said middle mat layer is bonded between said top mat layer and said base layer, wherein said base layer is made of the hot melt adhesive which is a composition comprising polypropylene, white oil, and Styrene Ethylene Butylene Styrene.

10. The method, as recited in claim 9, further comprising a step of mixing polypropylene with white oil, and then adding Styrene Ethylene Butylene Styrene into a mixture of polypropylene and white oil.

11. The method, as recited in claim 10, wherein a weight content of polypropylene in said base layer is ranged from 5% to 30%, wherein a weight content of Styrene Ethylene Butylene Styrene in said base layer is ranged from 20% to 50%, wherein a weight content of white oil in said base layer is ranged from 25% to 45%.

12. The method, as recited in claim 11, further comprising the steps of performing a heat transfer printing on a top of said top mat layer to form a heat transfer print thereof; and integrally forming a texture pattern over a bottom surface of said base layer to increase a floor contact area of said base layer.

13. The method, as recited in claim 12, further comprising a step of adding calcium carbonate and polyethylene into said mixture of polypropylene and white oil, wherein a weight content of calcium carbonate in said base layer is not more than 50%, wherein a weight content of polyethylene in said base layer is not more than 1%.

14. The method, as recited in claim 11, further comprising a step of adding calcium carbonate and polyethylene into said mixture of polypropylene and white oil, wherein a weight content of calcium carbonate in said base layer is not more than 50%, wherein a weight content of polyethylene in said base layer is not more than 1%.

15. The method, as recited in claim 11, wherein after said hot melt adhesive is melted and penetrate through said bottom of said middle mat layer, said hot melt adhesive is cooled and solidified to form said base layer.

16. The method, as recited in claim 9, wherein said top mat layer is bonded to said middle mat layer to form a composite layer by applying a pressure and temperature thereon and an adhesive therebetween, wherein said base layer is integrally formed on said bottom of said middle mat layer in a manner that said middle mat layer is sandwiched between said top mat layer and said base layer.

17. The method, as recited in claim 16, wherein after said hot melt adhesive is melted and penetrate through said bottom of said middle mat layer, said hot melt adhesive is cooled and solidified to form said base layer.

18. The method, as recited in claim 9, wherein after said hot melt adhesive is melted and penetrate through said bottom of said middle mat layer, said hot melt adhesive is cooled and solidified to form said base layer.

\* \* \* \* \*